US008824640B1

(12) United States Patent
Winsor et al.

(10) Patent No.: US 8,824,640 B1
(45) Date of Patent: Sep. 2, 2014

(54) METHODS, DEVICES AND SYSTEMS FOR CREATING OR SHARING A VISUAL INDICATOR PATTERN

(71) Applicant: Sorenson Communications, Inc., Salt Lake City, UT (US)

(72) Inventors: Eric Winsor, West Jordan, UT (US); Lane Walters, American Fork, UT (US); Phillip Shimek, Bear River City, UT (US); Miranda Johnson, Salt Lake City, UT (US); Mark Nelson, West Jordan, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 0 days.

(21) Appl. No.: 13/795,105

(22) Filed: Mar. 12, 2013

(51) Int. Cl.
*H04M 11/00* (2006.01)

(52) U.S. Cl.
USPC ........................................ 379/52; 379/376.01

(58) Field of Classification Search
USPC ............................................. 379/52, 376.01
See application file for complete search history.

(56) References Cited

U.S. PATENT DOCUMENTS

| | | | |
|---|---|---|---|
| 5,946,636 A | 8/1999 | Uyeno et al. |
| 6,016,038 A | 1/2000 | Mueller et al. |
| 6,150,774 A | 11/2000 | Mueller et al. |
| 6,166,496 A | 12/2000 | Lys et al. |
| 6,211,626 B1 | 4/2001 | Lys et al. |
| 6,340,868 B1 | 1/2002 | Lys et al. |
| 6,459,919 B1 | 10/2002 | Lys et al. |
| 6,528,954 B1 | 3/2003 | Lys et al. |
| 6,577,080 B2 | 6/2003 | Lys et al. |
| 6,608,453 B2 | 8/2003 | Morgan et al. |
| 6,690,955 B1 | 2/2004 | Komiyama |
| 6,717,376 B2 | 4/2004 | Lys et al. |
| 6,720,745 B2 | 4/2004 | Lys et al. |
| 6,788,011 B2 | 9/2004 | Mueller et al. |
| 6,806,659 B1 | 10/2004 | Mueller et al. |
| 6,888,322 B2 | 5/2005 | Dowling et al. |
| 6,897,624 B2 | 5/2005 | Lys et al. |
| 6,975,079 B2 | 12/2005 | Lys et al. |
| 7,085,358 B2 | 8/2006 | Ruckart |
| 7,135,824 B2 | 11/2006 | Lys et al. |
| 7,186,003 B2 | 3/2007 | Dowling et al. |
| 7,231,060 B2 | 6/2007 | Dowling et al. |
| 7,242,152 B2 | 7/2007 | Dowling et al. |
| 7,352,339 B2 | 4/2008 | Morgan et al. |
| 7,385,359 B2 | 6/2008 | Dowling et al. |
| 7,443,964 B2 | 10/2008 | Urban et al. |
| 7,610,044 B2 | 10/2009 | Sindoni |
| 7,642,730 B2 | 1/2010 | Dowling et al. |
| 7,764,026 B2 | 7/2010 | Dowling et al. |

(Continued)

FOREIGN PATENT DOCUMENTS

| | | |
|---|---|---|
| EP | 1324578 A2 | 7/2003 |
| GB | 2383716 A | 7/2003 |
| WO | 03077505 A2 | 9/2003 |

*Primary Examiner* — Creighton Smith
(74) *Attorney, Agent, or Firm* — TraskBritt, P.C.

(57) ABSTRACT

Methods, apparatuses, and devices for creating or sharing a visual indicator pattern for indicating a condition of an incoming communication. A storage device stores a plurality of visual indicator patterns for displaying on a spatial visual indicator. A user interface is configured to receive a command from a user. Responsive to the command, a user-created visual indicator pattern is stored on the storage device, or another visual indicator pattern is received from, or shared with, another user.

34 Claims, 12 Drawing Sheets

(56) References Cited

U.S. PATENT DOCUMENTS

| | | |
|---|---|---|
| 7,769,141 B2 * | 8/2010 | Cupal et al. .................. 379/52 |
| 7,929,675 B2 | 4/2011 | Ruckart |
| 8,688,161 B2 * | 4/2014 | Kies et al. .................. 455/518 |
| 2002/0183098 A1 | 12/2002 | Lee et al. |
| 2002/0196913 A1 | 12/2002 | Ruckart |
| 2003/0228003 A1 | 12/2003 | Vardon |
| 2007/0112977 A1 | 5/2007 | Hornal et al. |
| 2008/0167995 A1 | 7/2008 | Cue et al. |

\* cited by examiner ered as "flashers." Flashers or visual indicators may be implemented as a single light source located on or near the telephone or may be coupled to a more generally present light source such as a light bulb or lamp in a room inhabited by a hearing-impaired user. While such visual indicators provide notification to a user thereof, such visual indicators are "one dimensional" in information conveyed in that they provide only a notification of the occurrence of an event (e.g., the ringing of an incoming call).

METHODS, DEVICES AND SYSTEMS FOR CREATING OR SHARING A VISUAL INDICATOR PATTERN

TECHNICAL FIELD

The present disclosure relates to a user interface and, more particularly, to visual indicator patterns for display on a spatial visual indicator.

BACKGROUND

The use of indicators for identifying the activation of a device is commonplace. One predominant form of indicators utilizes an audible or sound-based mechanism for providing notification to a user. However, some persons may have impaired hearing capabilities and may even be completely deaf to audible indicators. Accordingly, such individuals are at a distinct disadvantage to detect and respond to such audible indicating devices.

One such device that has traditionally relied upon an audible indicator is a telephone or similar telecommunications device. Such devices have conventionally utilized a bell, speaker, or other audible device for notification to a user of an incoming call. For hearing-impaired users, or in environments that are not conducive to audible indicator detection, visual indicators have been developed. One known visual indication approach utilized by hearing-impaired users for identifying an incoming telephone call is illustrated with reference to a conventional visual notification system 100, as illustrated in FIG. 1. This prior approach connects a conventional telephone 200 through a coupling circuit 102 to a room lamp 104 or other light source. The coupling circuit 102, upon detection of a telephone "ring" signal on a communication network 106, causes, for example, a room light or lamp 104 to flash repeatedly when a ringing voltage or other signal designates an incoming call.

In such applications, and to the hearing-impaired community, telephone-coupling circuits and single light source visual indicator have often been referred as "flashers." Flashers or visual indicators may be implemented as a single light source located on or near the telephone or may be coupled to a more generally present light source such as a light bulb or lamp in a room inhabited by a hearing-impaired user. While such visual indicators provide notification to a user thereof, such visual indicators are "one dimensional" in information conveyed in that they provide only a notification of the occurrence of an event (e.g., the ringing of an incoming call).

While visual indicators exist that provide a visual indication of the origin of, for example, an incoming call, such visual notifications are generally not adequately able to alert a user and may readily go unnoticed. For example, FIG. 2 illustrates a conventional telephone 200 configured with a caller identification display 208 that provides a visual notification of an incoming call and even provides information correlated to the calling party. While the caller identification display 208 is configured to provide correlated information of the calling party, it is not, however, adequately visually alerting to draw attention to the telephone device.

An example of a system that provides an improved visual indication of the origin of incoming calls is described in U.S. Pat. No. 7,769,141 to Cupal et al. (Aug. 3, 2010), the disclosure of which is incorporated herein in its entirety by reference. FIG. 3 illustrates a simplified diagram of a spatial visual indicator system 300 according to the disclosure of Cupal et al. Cupal et al. describe a visual indicator system 300 including a telephone 200 and a spatial visual indicator device 310 configured to capture caller identification information from an incoming call on a communication network 306, and compare the caller identification information to a list of stored entries of reference caller identification information. The spatial visual indicator device 310 activates a plurality of illuminatable elements 304 on a spatial visual indicator 312 according to a spatial visual indicator pattern corresponding to a stored entry of reference caller identification information that matches the captured caller identification information from the incoming call. Although the system described by Cupal et al. improves visual indication of the origin of incoming calls, it is limited to utilizing spatial visual indicator patterns that are pre-programmed into the system, and provides limited flexibility to conform to a user's preferences.

BRIEF SUMMARY

Embodiments discussed herein include methods, devices and systems for providing a user interface configured to increase user flexibility in a visually spatial caller identification system.

In some embodiments, the present disclosure comprises a spatial visual indicator device. The spatial visual indicator device includes a storage device, a spatial visual indicator, and a user interface. The storage device is configured to store a plurality of visual indicator patterns and a plurality of possible conditions of an incoming communication. The spatial visual indicator is configured to display the plurality of visual indicator patterns. The user interface is configured to, responsive to receiving a command from a user, perform at least one operation selected from the group consisting of: cause a visual indicator pattern of the plurality of visual indicator patterns to be shared over a communication network, cause another visual indicator pattern to be received through the communication network and stored on the storage device, and enable the user to create and store a user-programmed visual indicator pattern to the storage device.

In other embodiments, the present disclosure comprises a method of visually indicating an incoming signal. The method includes storing a plurality of possible conditions of the incoming signal and a plurality of visual indicator patterns in a storage device. A current condition of the incoming signal that matches one or more of the plurality of possible conditions is detected. The method further includes assigning one or more of the plurality of possible conditions a visual indicator pattern of the plurality of visual indicator patterns. The method also includes directing a spatial visual indicator to display a visual indicator pattern of the plurality of visual indicator patterns that is assigned to the at least one of the plurality of possible conditions that matches the current condition responsive to detecting the current condition. The method further includes at least one of: sharing a visual indicator pattern of the plurality of visual indicator patterns through a communication network, receiving another visual indicator pattern through the communication network, and enabling a user to create an additional visual indicator pattern with a user interface.

In other embodiments, the present disclosure comprises a visual indicator system. The visual indicator system includes a communication device configured to communicate with a communication network. The visual indicator system also includes a storage device configured to store a plurality of visual indicator patterns, and a plurality of possible conditions. Each condition of the plurality of possible conditions corresponds to one of the plurality of visual indicator patterns. The visual indicator system further includes a spatial visual indicator. The spatial visual indicator is configured to display a plurality of visual indicator patterns. The visual indicator system also includes a control circuit. The control circuit is configured to monitor the communication network and detect a current condition of an incoming communication. The control circuit is further configured to direct the spatial visual indicator to display a visual indicator pattern of the plurality of visual indicator patterns that corresponds to a condition of the plurality of possible conditions that matches the current condition. The visual indicator system further includes a user interface. The user interface is configured to sense a user input. Responsive to the user input, the user interface is also configured to cause the control circuit to perform at least one operation selected from the group consisting of: send at least one of the plurality of visual indicator patterns through the communication network, receive through the communication network and store on the storage device an additional visual indicator pattern, and create and store a user-created visual indicator pattern on the storage device.

DETAILED DESCRIPTION

Figure 1:
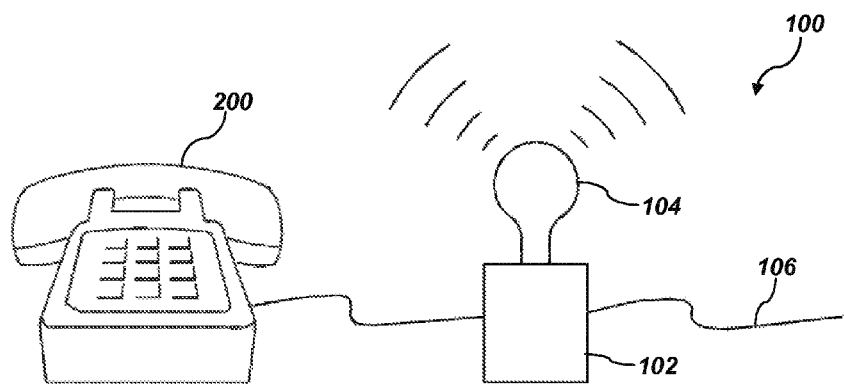
FIG. 1 is a simplified diagram of a conventional visual notification system.

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice the various features illustrated in the drawings may not be drawn to scale. The illustrations presented herein are not meant to be actual views of any particular method, device, or system, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill in the art would understand that information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

Those of ordinary skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

The term "incoming call" refers to an incoming communication to a communication device such as a portable communication device as well as less portable audio and video communication devices. This incoming communication should be considered to include communications such as, for example, E-mail, text messages, instant messages, voice communications, and video communications.

Embodiments of the present disclosure include systems, methods and devices for providing an improved user interface for a spatial visual indicator system. It should be noted that while the utility and application of the various embodiments of the present disclosure are described with reference to a hearing-impaired environment, the present disclosure also finds application to any environment where an improved user interface for a spatial visual indicator may be helpful or desirable.

Figure 4:
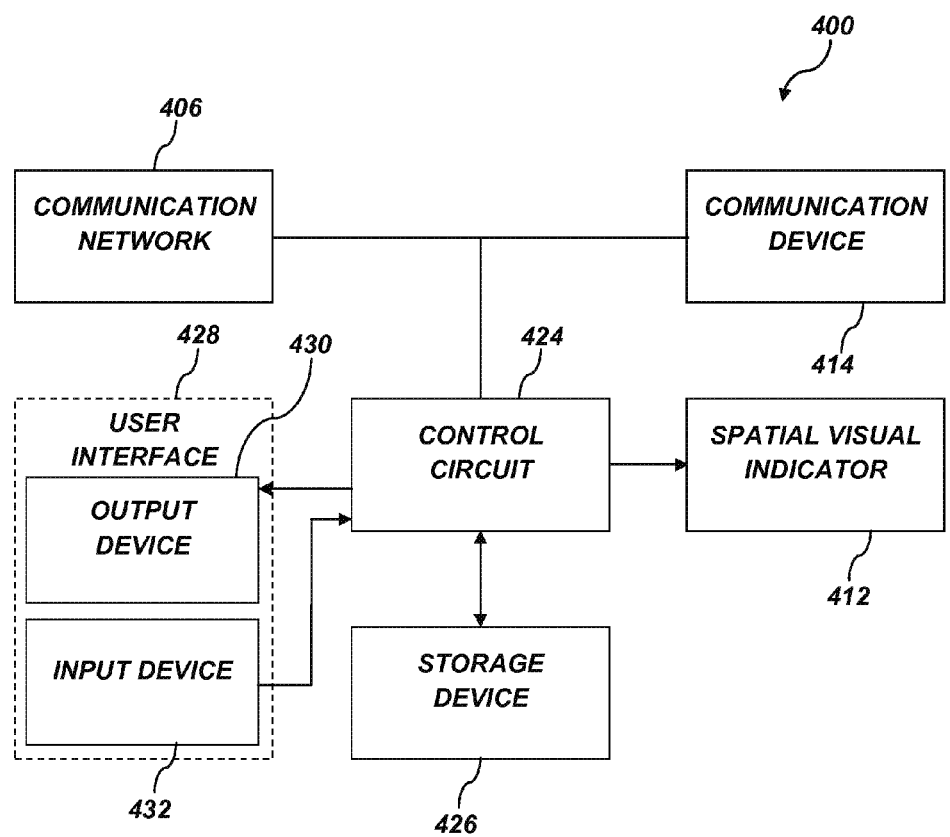
FIG. 4 is a simplified block diagram of a spatial visual indicator system with an improved user interface.

FIG. 4 is a simplified block diagram of a spatial visual indicator system 400 with an improved user interface. As previously stated, visual indicators for conventionally audible indicating devices provide utility to hearing-impaired individuals who are physically incapable of detecting audible sounds or in situations where an audible indicator may be difficult to detect, such as in a noisy work environment. In FIG. 4, the spatial visual indicator system 400 may include a communication network 406, a communication device 414, a user interface 428, a control circuit 424, a storage device 426, and a spatial visual indicator 412.

The communication network 406 may include a public switched telephone network (PSTN), an internet protocol (IP) network, a mobile network, other suitable network, and combinations thereof. Additionally, the communication network 406 may comprise any one or combination of a personal area network (PAN), a local area network (LAN), a wide area network (WAN), or other suitable network. Furthermore, the communication network 406 may be configured either as a wireless network, such as "wifi," and cellular networks or a wired network.

The storage device 426 may include any one or combination of a random access memory, a computer readable media, a flash memory, and an erasable programmable read only memory, etc. The storage device 426 may be configured to store a plurality of visual indicator patterns and a plurality of possible conditions of an incoming communication. The plurality of visual indicator patterns may be configured for displaying on the spatial visual indicator 412.

As non-limiting examples, the plurality of possible conditions of the incoming communication may include information that identifies the source of the incoming communication, such as a telephone number, an IP address, or a media access control (MAC) address. Each condition of the plurality of possible conditions of the incoming communication may be assigned a corresponding visual indicator pattern of the plurality of visual indicator patterns.

The spatial visual indicator 412 may include a plurality of illuminatable elements, arranged in at least a two-dimensional arrangement. The plurality of illuminatable elements may be configured to be varied in any of color, brightness, and position, in order to display each of the plurality of visual indicator patterns. By way of example, and not of limitation, the plurality of illuminatable elements may be a plurality of red green blue (RGB) light emitting diodes (LEDs) arranged in at least a two-dimensional arrangement, such as, for example, a circular ring. Also by way of example, and not of limitation, the plurality of illuminatable elements may include a screen display configured to display a plurality of shapes arranged in at least a two-dimensional arrangement. As non-limiting examples, the screen display may include any of an LED array, a liquid crystal display, a cathode ray tube display, and a plasma display.

The spatial visual indicator 412 may be configured to include one or more devices configured to alter a user's perception of a displayed visual indicator pattern. By way of non-limiting example, the spatial visual indicator 412 may include optical elements such as a lens, a diffuser, and an infinity mirror. More detail with respect to the lens will be discussed below with respect to FIGS. 7A through 7E.

The spatial visual indicator 412 may be configured to display each of the plurality of visual indicator patterns. The plurality of visual indicator patterns may each include one or more sequential frames. The one or more sequential frames may each include a presentation of each of the plurality of illuminatable elements, including variations of color, brightness, position, or combinations thereof. TABLE 1 describes a few non-limiting examples of possible visual indicator patterns.

TABLE 1

| Name of Pattern | Description |
| --- | --- |
| Altering Colors and Brightness Pattern | Illuminatable elements fading from dim to bright in one color then dim back to off, repeated with a plurality of colors. |
| Dimming Tail Pattern | A first illuminatable element is lit at full brightness. The rest of the illuminatable elements are then lit one at a time, and with each new lighting, each previously lit illuminatable element is dimmed, causing an effect of a trail of diminishing brightness behind a leading illuminatable element. |
| Rainbow Pattern | Illuminatable elements fade from a first color to a second color, repeated through a plurality of colors, with as many shades in between as desired. |
| Sparkling Pattern | Illuminatable elements are lit at random with random brightness levels creating an effect of a sparkling constellation of colors. |
| Police Pattern | The illuminatable elements all alternate from red to blue at full brightness to mimic the lights on top of a police car. |
| Fire Pattern | The illuminatable elements are all lit solid red and their brightness levels are all repeatedly cycled from bright to dim to bright again. |
| Caution Pattern | The illuminatable elements are all repeatedly flashed orange for a brief moment, each flash separated by a pause that lasts twice as long as each flash, mimicking caution lights of traffic barricades. |

The user interface 428 may include an input device 432 and an output device 430. The input device 432 and the output device 430 may optionally be implemented as a single user interface 428 device, as shown with the dotted line of FIG. 4, such as a touch-screen display. In other embodiments of the present disclosure, the input device 432 and the output device 430 may be implemented as separate devices. By way of example, and not of limitation, the input device 432 may include any one or combination of a mouse, a keyboard, a track pad, a button array, a camera, a microphone, and a remote control. Also by way of example, and not of limitation, the output device 430 may include any one or combination of an LED array, a segmented display, a liquid crystal display, a cathode ray tube display, and a plasma display.

The input device 432 may be configured to sense a command from a user. Also, the user interface 428 may be configured to cause a visual indicator pattern of the plurality of visual indicator patterns to be shared over the communication network 406 responsive to the command, as discussed in more detail below with reference to FIG. 6. The user interface 428 may further be configured to cause another visual indicator pattern to be received through the communication network 406 and stored on the storage device 426, responsive to the command, as also discussed in more detail below with reference to FIG. 6. The user interface 428 may also be configured to enable the user to create and store at least one user-programmed visual indicator pattern to the storage device 426, responsive to the command, as discussed in more detail below with reference to FIGS. 5A and 5B.

The user interface 428 may be implemented in part with a software program. Some or all of the software program may be stored and executed remotely and accessed as a web interface. Also, some or all of the software program may be stored and executed as a stand-alone application on a computer, or a personal communication device such as a tablet computer or a cellular telephone. Alternatively, the software program may be implemented as a built-in application on the communication device 414.

Figure 2:
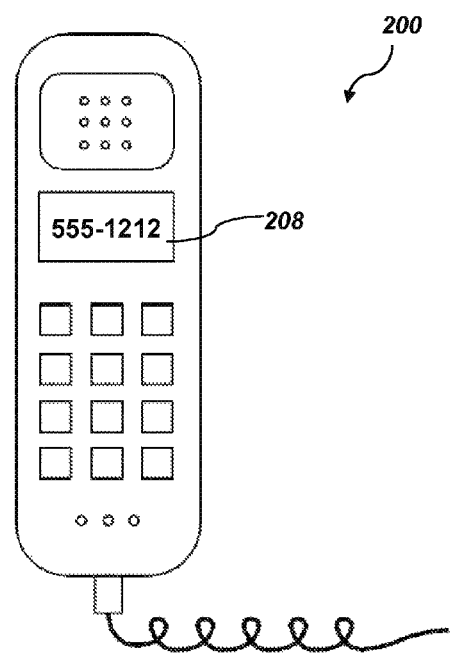
FIG. 2 is a simplified diagram of another conventional visual notification system.
Figure 3:
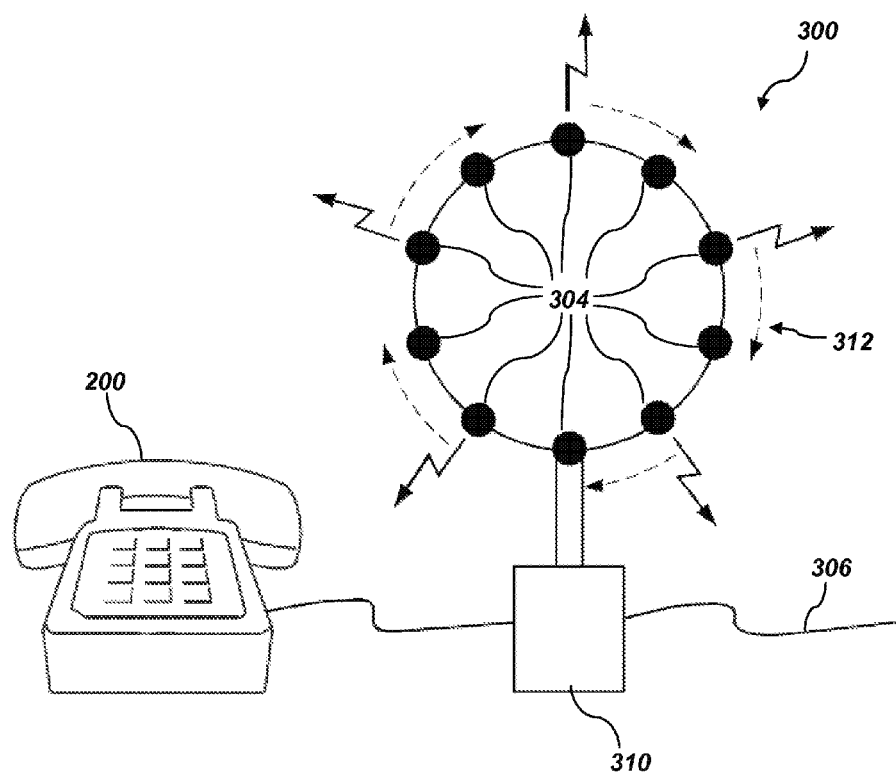
FIG. 3 is as simplified diagram of a conventional spatial visual indicator system.

The communication device 414 may be a conventional telephone 200 (FIGS. 1 through 3), a cellular telephone, a tablet computer, a laptop computer, a desktop computer, a communication device for the hearing impaired such as a video telephone device, or any device configured to send and receive communications.

The control circuit 424 may be configured to control the spatial visual indicator system 400. The control circuit 424 may be operably coupled to the communication network 406, the communication device 414, the user interface 428, the storage device 426, and the spatial visual indicator 412. The control circuit 424 may be configured to monitor the communication network 406 and detect a current condition of an incoming communication. By way of non-limiting example, the current condition may comprise information indicating a source of the incoming communication, such as an internet protocol (IP) address, a media access control (MAC) address, or a source telephone number.

The control circuit 424 may also be configured to compare the current condition of the incoming communication to the plurality of possible conditions stored on the storage device 426, and direct the spatial visual indicator 412 to display a visual indicator pattern assigned to a condition of the plurality of possible conditions that matches the current condition. The plurality of possible conditions may each be associated with an entry from a contact list, or list of persons the user is acquainted with.

In some embodiments of the present disclosure, more than one element of the spatial visual indicator system 400 may be integrated into a single device. By way of non-limiting example, the user interface 428 may be integrated within the communication device 414. Also by way of non-limiting example, the spatial visual indicator 412 may be integrated into the same device as the user interface 428, permitting the plurality of illuminatable elements to be displayed on the output device 430 of the user interface 428. A further non-limiting example may include combining the user interface 428, the communication device 414, the spatial visual indicator 412, the storage device 426, and the control circuit 424 into a single spatial visual indicator device.

Other combinations or separations of the elements of the spatial visual indicator system 400 are possible, and those of ordinary skill in the art will appreciate that signals may be communicated between the various elements of the spatial visual indicator system 400 in various ways. By way of non-limiting example, the user interface 428 may be implemented remote from the communication device 414 as a portable communication device, such as a tablet computer, a cellular telephone, or a remote control. The user interface 428 may be configured to send and receive signals to the control circuit 424 through any of the communication network 406, a mobile data network, infrared, bluetooth, a wireless network, a cable, and combinations thereof. Also by way of non-limiting example, the input device 432 of the user interface 428 may be implemented as a remote control comprising an infrared transmitter, and the communication device 414 may be implemented as a video telephone together with the output device 430 of the user interface 428 and an infrared receiver.

Figure 5A:
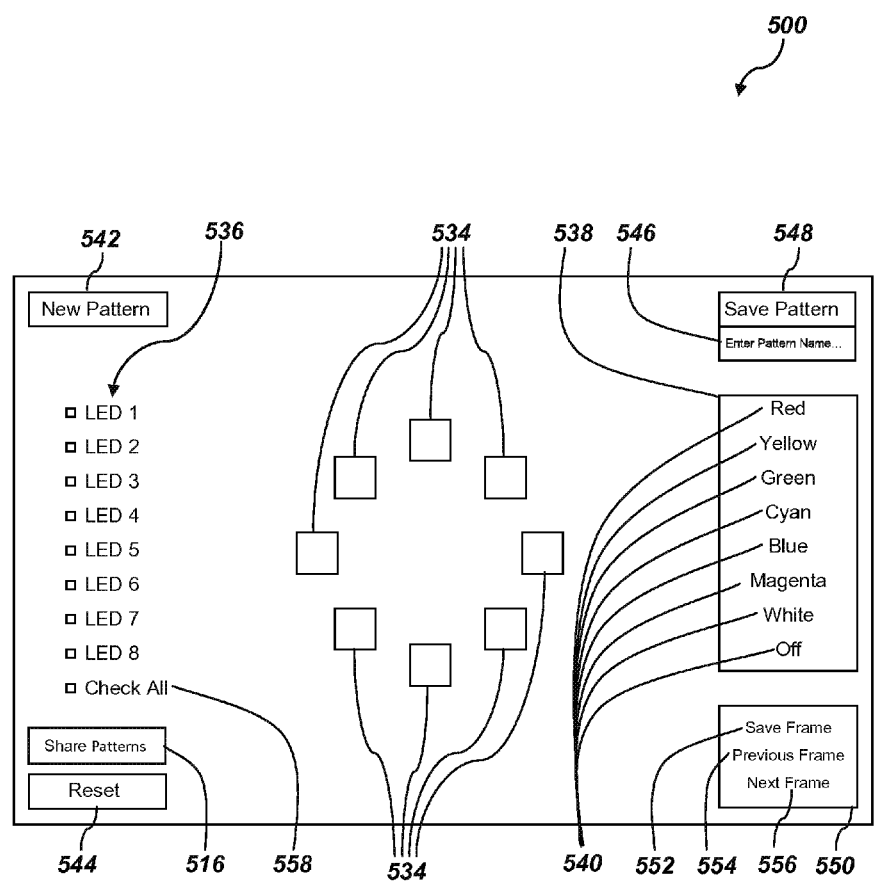
FIG. 5A is a simplified schematic illustration of a user interface of a spatial visual indicator system.

FIG. 5A is a simplified schematic illustration of a non-limiting example for the user interface 428 (FIG. 4) of the spatial visual indicator system 400 in a pattern-editing mode. Referring to FIGS. 4 and 5A, the user interface 428 may include a screen display 500 configured to display a plurality of illuminatable element indicators 534, a plurality of illuminatable element selection options 536, a color selection field 538, a new pattern option 542, a reset option 544, an enter pattern name field 546, a save pattern option 548, a frame options field 550, and a share patterns option 516.

The plurality of illuminatable element indicators 534 may be configured in an arrangement similar to the plurality of illuminatable elements of the spatial visual indicator 412 (FIG. 4). In the embodiment of FIG. 5A, the user interface 428 includes eight illuminatable element indicators 534 corresponding to eight illuminatable elements of the spatial visual indicator 412, arranged in a circular ring. Other arrangements of illuminatable elements may be utilized, according to other embodiments of the present disclosure. By way of non-limiting example, the illuminatable elements may alternatively be arranged in a ring, a uniform spacing, or irregular spacing in any of a limitless possibility of shapes, including a rectangle, a triangle, a circle, and an oval, or combinations thereof. In still other embodiments, the plurality of illuminatable elements may be arranged in a three-dimensional manner. Regardless of the manner the plurality of illuminatable elements is arranged in, the plurality of illuminatable element indicators 534 may be configured similarly to the plurality of illuminatable elements.

The plurality of illuminatable element selection options 536 may be configured to enable a user to select one or more of the plurality of illuminatable element indicators 534 for editing. Some of the plurality of illuminatable element selection options 536 may correspond to one of the plurality of illuminatable element indicators 534. Others of the plurality of illuminatable element selection options 536 may include selection options for simultaneously selecting two or more of the plurality of illuminatable element indicators 534, such as a non-limiting example of a "check all" option 558. Although not illustrated in FIG. 5A, the present disclosure contemplates other selection options, including an even illuminatable element selection option, an odd illuminatable element selection option, other suitable selection options, and combinations thereof.

In the embodiment of FIG. 5A, the plurality of illuminatable element selection options 536 do not include the plurality of illuminatable element indicators 534. In other embodiments of the present disclosure, however, the plurality of illuminatable element indicators 534 may themselves be illuminatable element selection options 536.

Still referring to FIGS. 4 and 5A, the color selection field 538 comprises a plurality of color selection options 540 that the user may apply to one or more illuminatable element indicators 534 that have been selected with one or more of the plurality of illuminatable element selection options 536. The embodiment of FIG. 5A illustrates "red," "yellow," "green," "cyan," "blue," "magenta," "white," and "off" color selection options 540. The present disclosure, however, is not so limited. By way of non-limiting example, the color selection field 538 may alternatively include a color pallet, a color wheel, or a color slider. Also by way of non-limiting example, the color selection field 538 may be configured to provide tens, hundreds, thousands, or even more color selection options 540, limited only by the spatial visual indicator's 412 ability to generate a corresponding color at the plurality of illuminatable elements.

Although not pictured in FIG. 5A, the user interface 428 may include a brightness selection field or a position selection field, configured with options to enable the user to vary the brightness or position, respectively, of the illuminatable elements in a user-created visual indicator pattern.

The user interface 428 may cause a new user-created visual indicator pattern to be created responsive to the user selecting the new pattern option. The user interface 428 may also cause a current frame of the user-created visual indicator pattern to be cleared responsive to the user selecting the reset option 544. The user interface 428 may further cause the user-created visual indicator pattern to be saved to the storage device 426 responsive to the user selecting the save pattern option 548. The enter pattern name field 546 may be configured to receive a name for the user-created visual indicator pattern.

The frame options field 550 may include a save frame option 552, a previous frame option 554, and a next frame option 556. The user-created visual indicator pattern may include one or more sequential frames. The plurality of illuminatable element indicators 534, therefore, are configured to display a current frame of the one or more sequential frames. The frame options field 550 may be configured to enable the user to manage the one or more sequential frames.

Responsive to the user selecting the save frame option 552, the user interface 428 may cause the current frame of the user-created visual indicator pattern to be saved to the storage device 426. Also, responsive to the user selecting the previous frame option 554, the user interface 428 may cause a previous frame, if any, of the one or more sequential frames, to be displayed on the plurality of illuminatable element indicators 534. Further, responsive to the user selecting the next frame option 556, the user interface 428 may cause a next frame, if any, to be displayed on the plurality of illuminatable element indicators 534. If there is either no previous frame or no next frame, the user interface 428 may be configured to generate a blank previous or next frame, responsive to selecting the previous frame option 554 or the next frame option 556, respectively.

The share patterns option 516 may be selected to cause the user interface 428 to transition into a pattern-sharing mode (see below with respect to FIG. 6), which may be configured to enable the user to share one or more visual indicator patterns.

Figure 5B:
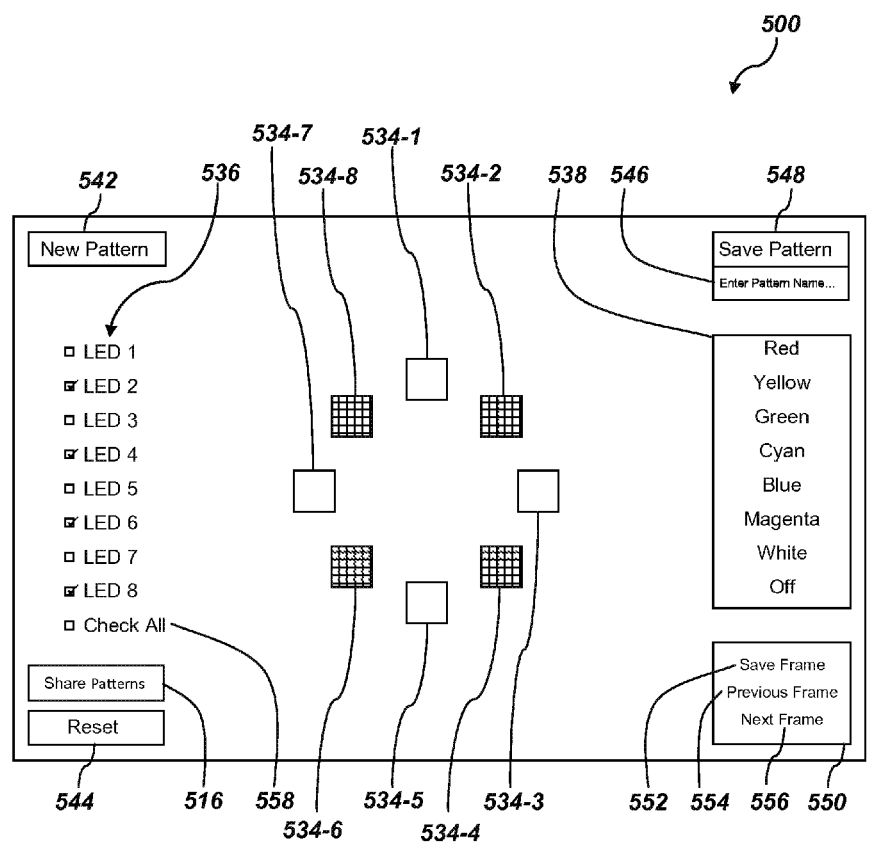
FIG. 5B illustrates the user interface of FIG. 5A after receiving a plurality of commands from a user.

FIG. 5B illustrates the user interface 428 of FIG. 5A after receiving a plurality of commands from a user. Referring to FIGS. 4, 5A, and 5B, the illuminatable elements may be RGB LEDs. As previously discussed, however, the present disclosure is not so limited. In FIG. 5B, the plurality of illuminatable element selection options 536 include "LED 1" through "LED 8" selection options. The LED 1 through LED 8 selection options correspond to illuminatable element indicators 534-1 through 534-8, respectively.

FIG. 5B shows a plurality of illuminatable element selection options 536. Specifically, LED 2, LED 4, LED 6, and LED 8 selection options 536 are marked as selected in FIG. 5B. Following the selection of LED 2, LED 4, LED 6, and LED 8 selection options 536, the yellow color selection option 540 from the color selection field 538 was selected. As a result, illuminatable element indicators 534-2, 534-4, 534-6, and 534-8 are shown shaded yellow in FIG. 5B.

Figure 6:
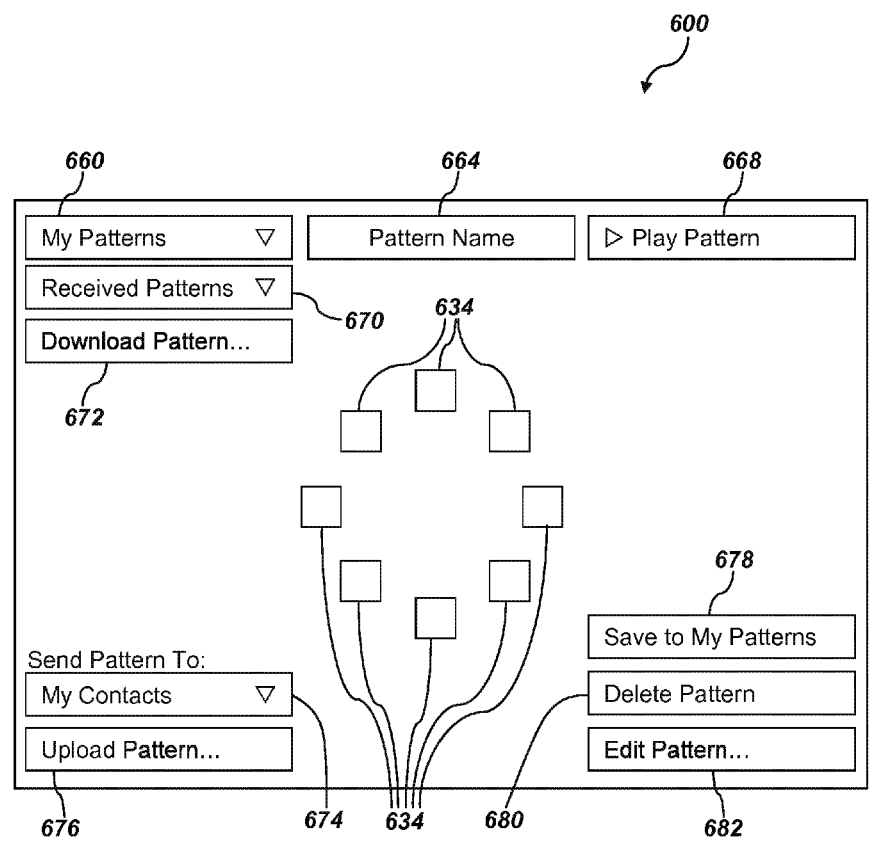
FIG. 6 is a simplified schematic illustration of the user interface of the visual indicator system 400 in a pattern-sharing mode.

FIG. 6 is a simplified schematic illustration of the user interface 428 (FIG. 4) of the spatial visual indicator system 400 in a pattern-sharing mode. Referring to FIGS. 4 and 6, the user interface 428 may include a screen display 600 configured to display a plurality of illuminatable element indicators 634, a my patterns option 660, a pattern name field 664, a play pattern option 668, a received patterns option 670, a download pattern option 672, a send to contact option 674, an upload pattern option 676, a save option 678, a delete pattern option 680, and an edit pattern option 682.

The plurality of illuminatable element indicators 634 may be configured as the plurality of illuminatable element indicators 534 described above with respect to FIGS. 5A and 5B.

The my patterns option 660 may be configured as a drop-down menu that displays a list of names that correspond to the plurality of visual indicator patterns stored in the storage device 426 responsive to the user selecting the my patterns option 660. A name of a visual indicator pattern may then be selected.

The received patterns option 670 may be configured as a drop-down menu that displays a list of names that correspond to one or more received visual indicator patterns, responsive to the user selecting the received patterns option 670. The one or more received visual indicator patterns may be visual indicator patterns that other users of similar spatial visual indicator systems 400 sent to the user. A name from the list of names that correspond to the one or more received visual indicator patterns may be selected.

The download pattern option 672 may be selected to cause the user interface 428 to establish communication with a website or a database through the communication network 406, and enable the user to select and download one or more of a plurality of downloadable visual indicator patterns.

The pattern name field 664 may be configured to display a name of a visual indicator pattern that has been selected using one of the my patterns option 660, the received patterns option 670, or the download pattern option 672.

The play pattern option 668 may be selected to cause the plurality of illuminatable element indicators 634 to sequentially display each frame of one or more frames that make up the visual indicator pattern that corresponds to the name that is displayed in the pattern name field 664 (hereinafter "the selected visual indicator pattern"). The play pattern option 668, therefore, may enable the user to observe the selected visual indicator pattern.

The send to contact option 674 may be selected to cause the user interface 428 to display a list of contacts. Responsive to the user selecting from the list of contacts, the user interface 428 may be sent to a similar spatial visual indicator system 400 that belongs to the selected contact through the communication network 406.

The upload pattern option 676 may be selected to cause the selected visual indicator pattern to be uploaded to a website or a database. Uploading the selected visual indicator pattern may allow other users to download the selected visual indicator pattern.

The save option 678 may be selected to cause the selected visual indicator pattern to be saved to the storage device 426.

The delete option 680 may be selected to cause the selected visual indicator pattern to be removed from the storage device 426.

The edit pattern option 682 may be selected to cause the user interface 428 to transition into the pattern-editing mode (see above with respect to FIGS. 5A and 5B), which may be configured to enable the user to create one or more visual indicator patterns.

Figure 7A:
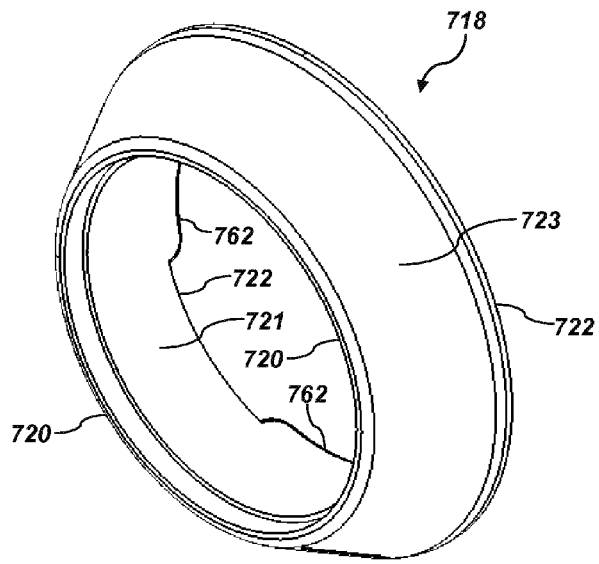
FIGS. 7A through 7E illustrate a lens configured for mounting in front of illuminatable elements of a spatial visual indicator as shown in FIG. 4.
Figure 7B:
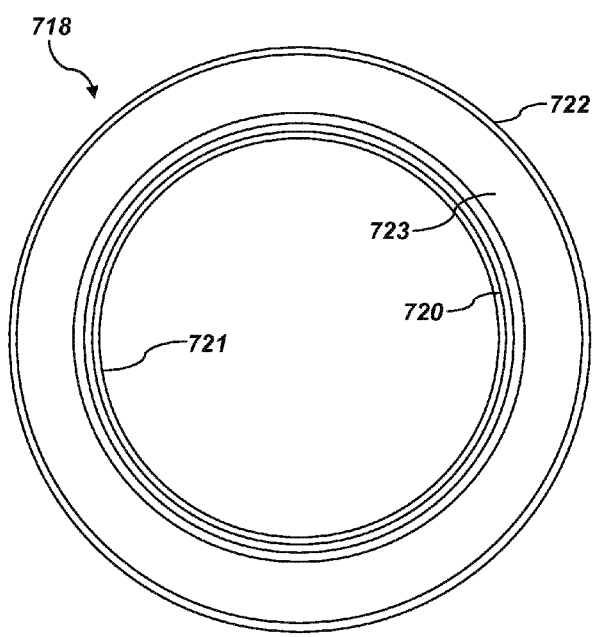
Figure 7C:
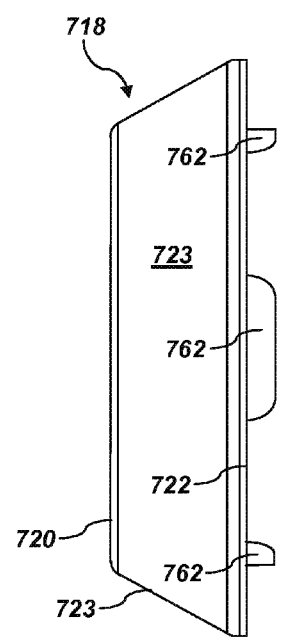
Figure 7D:
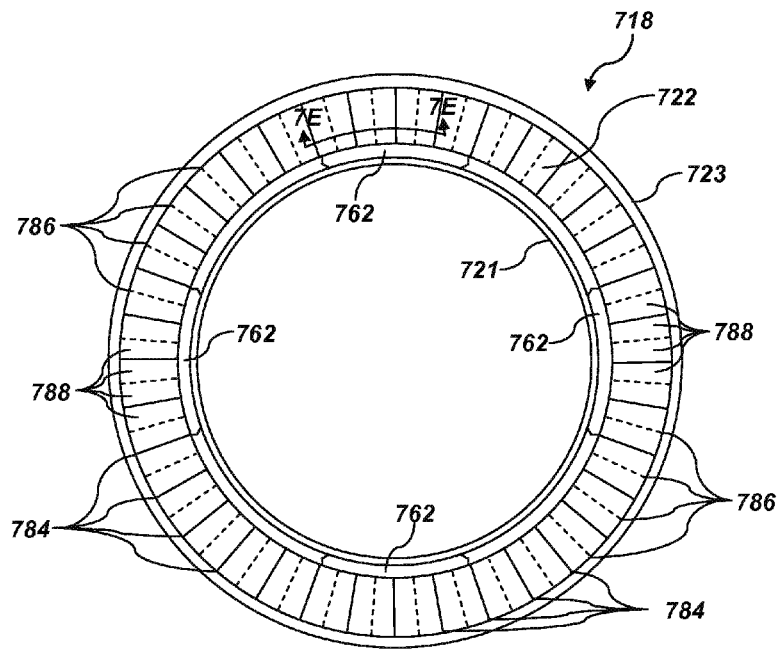

FIGS. 7A through 7D illustrate a lens 718 configured for mounting in front of the illuminatable elements of the spatial visual indicator 412 (FIG. 4). FIG. 7A is a simplified perspective view of the lens, FIG. 7B is a plan view of a front side 720 of the lens 718, FIG. 7C is a side view of the lens 718, and FIG. 7D is a plan view of a back side 722 of the lens 718. Referring to FIGS. 7A through 7D together, the lens 718 may include an outer surface 723 and an inner surface 721. The lens 718 may include one or more connecting members 762 extending from the back side 720 near the inner surface 721 of the lens 718.

By way of non-limiting example, the lens 718 may include a transparent plastic, a translucent plastic, a glass, a clear acrylic, a trivex, a polycarbonate, and combinations thereof. Also by way of non-limiting example, the lens may comprise a material with a refractive index of approximately 1.49. Those of ordinary skill in the art will recognize that many different materials include optical properties and a wide range of refractive indices, and the lens 718 may include any of a variety of materials with optical properties suitable for the embodiments discussed herein.

Figure 7E:
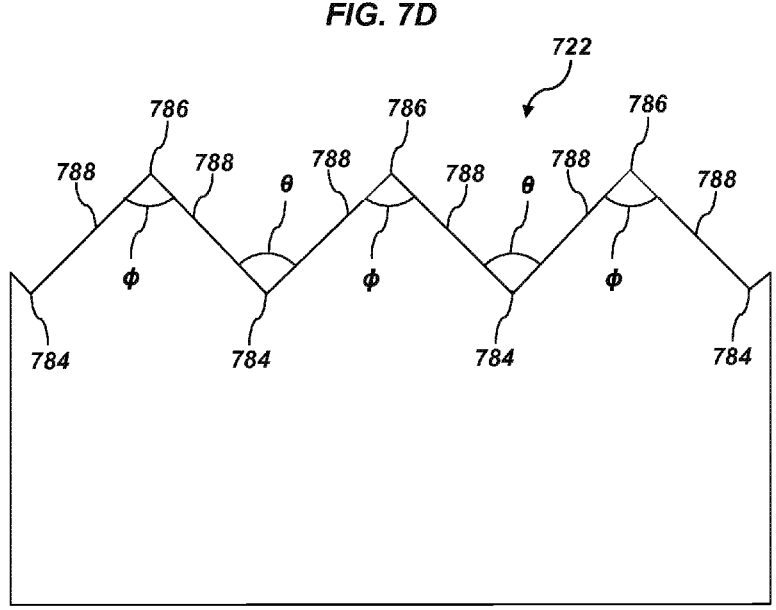

The back side 720 of the lens 718 may include a plurality of valleys 784 (solid lines on FIG. 7D) and a plurality of peaks (dashed lines on FIG. 7D) 786 defined by a plurality of facets 788. FIG. 7E is a cross-sectional view of a portion of the back side 722 of the lens 718, the cross-section taken along line 7E of FIG. 7D. Although the line 7E of FIG. 7D is curved, the cross-sectional view of FIG. 7E is depicted as a flat cross section, for convenience. Referring to FIGS. 7D and 7E together, each of the plurality of valleys 784 may be located at the bottom of two facets 788 forming an angle θ with respect to each other. Likewise, each of the plurality of peaks may be located at the top of two facets 788 forming an angle φ with respect to each other. In some embodiments, all the angles θ and φ may be equal to ninety degrees. In other embodiments, the angles θ and φ at different valleys 784 and peaks 786 may vary.

The valleys 784 and peaks 786 may be formed by placing heated lens material into a mold configured with valleys 784 and peaks 786, and allowing the heated lens material to cool. The valleys 784 and peaks 786 may also be formed by grinding and/or cutting a cool mass of the lens material into the valleys 784 and peaks 786. By way of non-limiting example, the valleys 784 and peaks 786 may be formed by hand grinding and/or cutting facets 788 into the lens material. Also by way of non-limiting example, a laser may be used to cut the facets 788 into the lens material.

Referring again to FIGS. 7A through 7D, in some embodiments, the front side 720, the outside surface 723, and the inside surface 721 of the lens 718 may be substantially smooth. In other embodiments, one or more facets 788 may be formed into the front side 720, the outside surface 723, and/or the inside surface 721 of the lens 718. In still other embodiments, the outside surface 723 of the lens may be coated in a layer of material configured to scatter light.

Figure 8A:
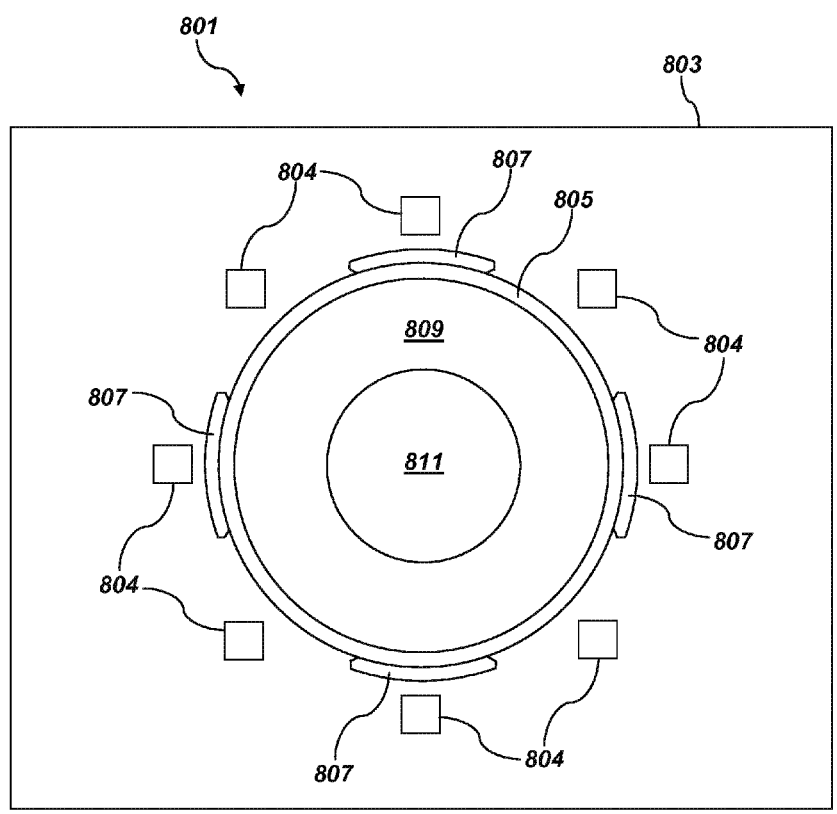
FIGS. 8A and 8B illustrate another arrangement for a spatial visual indicator.

FIG. 8A is a front view of a spatial visual indicator 801. By way of non-limiting example, the spatial visual indicator 801 may include a plate-like member 803, a plurality of illuminatable elements 804, an aperture 805 in the plate-like member 803, a camera lens assembly 809 exposed by the aperture 805, and one or more connecting receptacles 807 around the outside edge of the aperture 805.

Also by way of non-limiting example, the plurality of illuminatable elements 804 may be arranged in a ring pattern around the aperture 805. In some embodiments, each of the plurality of illuminatable elements 804 may be mounted in front of the plate-like member 803. In other embodiments, each of the plurality of illuminatable elements 804 may be located underneath the plate-like member 803, and the plate-like member 803 may be configured with a hole in front of each of the plurality of illuminatable elements 804. In still other embodiments, each of the plurality of illuminatable elements 804 may be located underneath the plate-like member 803, and the plate-like member 803 may comprise a material that permits light from the illuminatable elements 804 to travel through the plate-like member 803, such as, for example, a clear plastic or a glass.

The camera lens assembly 809 may be part of a camera (not shown) located behind the plate-like member 803. The camera lens assembly may include a camera lens 811. The camera may include devices capable of capturing and converting visual images to data, as will be readily apparent to those skilled in the art. By way of non-limiting example, the camera may include a webcam, a camcorder device, and other suitable devices. For applications of the present disclosure related to use by the hearing-impaired, the camera may facilitate communication by recording video images of a user communicating in sign language. In some embodiments, a camera may not be integrated with the spatial visual indicator 801.

Figure 8B:
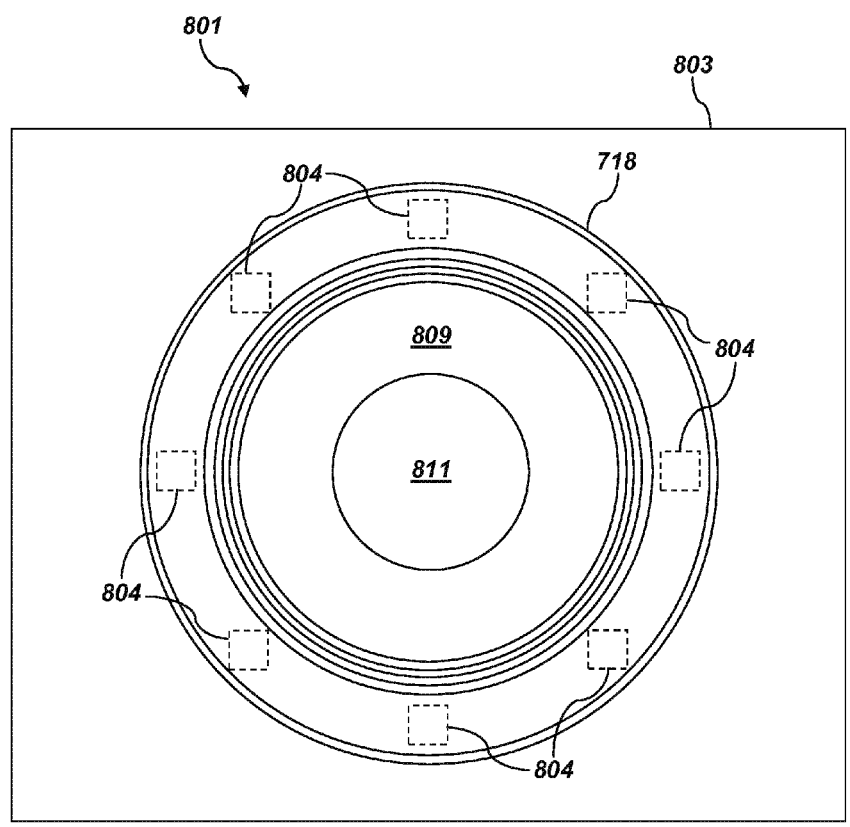

The one or more connecting receptacles 807 may be configured to physically couple to the one or more connecting members 762 of the lens 718 (FIGS. 7A through 7D), such that the back side 722 of the lens 718 faces the plurality of illuminatable elements 804. FIG. 8B is a front view of the spatial visual indicator 801 of FIG. 8A with the lens 718 mounted thereto. The plurality of illuminatable elements 804 are shown with dotted lines to indicate their presence behind the lens 718.

Each of the plurality of illuminatable elements 804 may emit light towards the back side 722 of the lens 718. As the light strikes the back side 722 of the lens 718, the facets 788 may cause the light to reflect externally and internally to the lens 718. The lens 718 may also cause the light to refract, magnify, concentrate, form beams, and combinations thereof. The lens 718 may cause the light to be spread out at multiple angles within a 180 degree spread. The overall effect may be a sparkling effect.

In some embodiments, instead of all of the plurality of illuminatable elements 804 being mounted to the plate-like member 803, some or all of the plurality of illuminatable elements 804 may be mounted to any of the outside surface 723, the inside surface 721, the front side 720, the back side 722, inside of the lens 718, and combinations thereof.

Figure 9A:
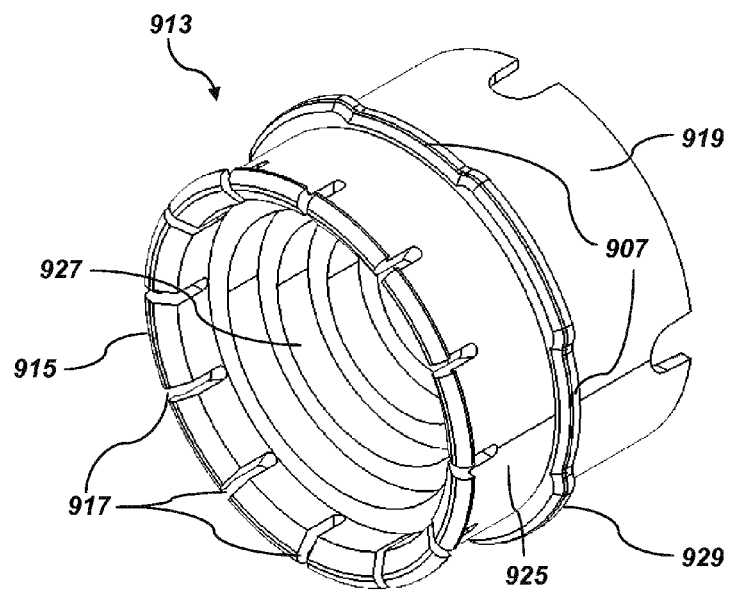
FIGS. 9A through 9C illustrate another arrangement for mounting a lens to a spatial visual indicator.
Figure 9B:
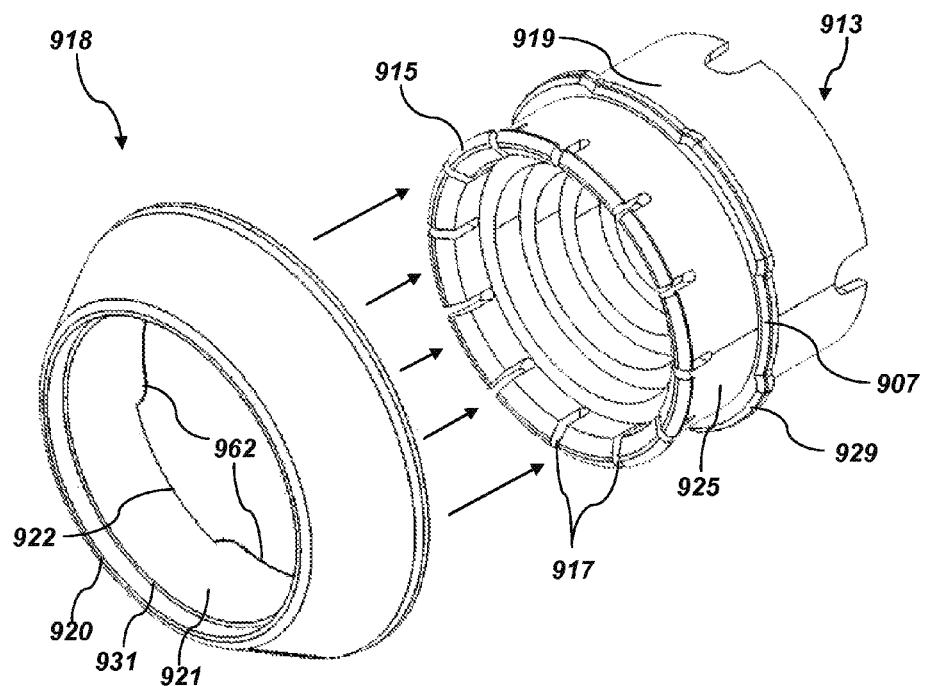
Figure 9C:
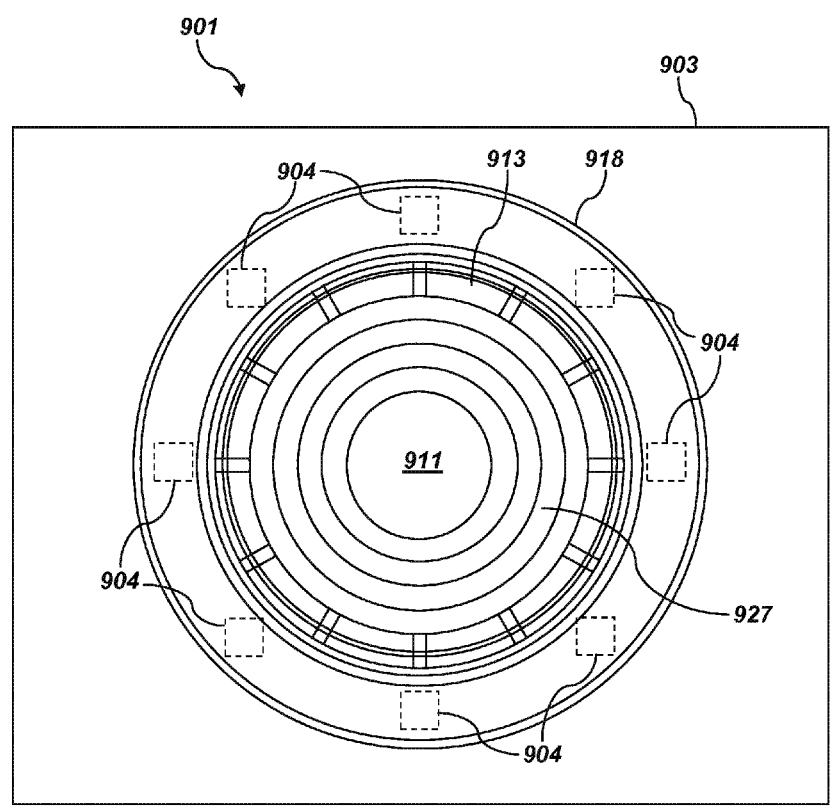

FIGS. 9A through 9C illustrate another method of mounting a lens 918 to a spatial visual indicator 901. FIG. 9A is a perspective view of a sleeve assembly 913 that may be used to mount the lens 918 to the spatial visual indicator 901. The sleeve assembly 913 may include a front portion 925 and a back portion 919 separated by a ridge 929 including one or more connecting receptacles 907. The front portion 925 may include a flanged rim 915 with one or more rim gaps 917. The front portion 925 may also include a terraced interior 927.

FIG. 9B is a perspective view illustrating the physical coupling of the lens 918 to the sleeve assembly 913. An inside surface 921 of the lens 918 may slide over the flanged rim 915 of the sleeve assembly 913 until the flanged rim 915 reaches an interior lip 931 of the lens 918. The rim gaps 917 may enable the flanged rim 915 to flex to fit into a back side 922 of the lens 918. The flanged rim 915 may snap into place at the interior lip 931 of the lens 918. Also, one or more connecting members 962 of the lens 918 may be secured into the one or more connecting receptacles 907 of the sleeve assembly 913.

The lens 918 and the sleeve assembly 913 may be configured such that the inside surface 921 of the lens 918 does not physically couple to the sleeve assembly 913. By way of non-limiting example, a diameter of the inner surface 921 of the lens 918 may be greater than a diameter of the front portion 925 of the sleeve assembly 913. Reducing a surface area of the lens 918 that physically couples to the sleeve assembly 913 may reduce the amount of light absorbed by the sleeve assembly 913, and may increase the amount of light observed by a user.

FIG. 9C is a front view of a spatial visual indicator 901 with the lens 918 and the sleeve assembly 913 mounted thereto. The spatial visual indicator 901 of FIG. 9C may be similar to the spatial visual indicator 801 of FIGS. 8A and 8B, except that a plate-like member 903 may not include the connecting receptacles 807 in the plate-like member 803 of FIG. 8A. The spatial visual indicator 901 of FIG. 9C may otherwise be similar to that of FIGS. 8A and 8B, including the plate-like member 903, a plurality of illuminatable elements 904, an aperture (not shown as it is behind the lens 918 and the sleeve member 913), a camera lens assembly (also not shown) including a camera lens 911. Also, the lens 918 of FIGS. 9B and 9C may be similar to the lens 718 of FIGS. 7A through 7E and FIG. 8B.

Referring to FIGS. 9A through 9C together, the lens 918 and the sleeve assembly 913 may be physically coupled together as discussed above with respect to FIG. 9B. The back portion 919 of the sleeve assembly 913 may be configured to slide into the aperture and onto the camera lens assembly of the spatial visual indicator 901. By way of non-limiting example, an inside of the back portion 919 of the sleeve assembly 913 may be hollow, and shaped to fit around and secure to the camera lens assembly. The terraced interior 927 of the front portion 925 of the sleeve assembly 918 may be configured to minimize shadowing of the camera lens 911.

Similar to the lens 718 of FIG. 8B, the lens 918 of FIG. 9C may be positioned in front of the plurality of illuminatable elements 904 (shown with dotted lines to indicate presence behind the lens 918).

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A spatial visual indicator device comprising:
   a storage device configured to store a plurality of visual indicator patterns and a plurality of possible conditions of an incoming communication;
   a spatial visual indicator configured to display the plurality of visual indicator patterns; and
   a user interface configured to, responsive to receiving a command from a user, perform at least one operation selected from the group consisting of:
      cause a visual indicator pattern of the plurality of visual indicator patterns to be shared over a communication network;
      cause another visual indicator pattern to be received through the communication network and stored on the storage device; and
      enable the user to create and store a user-programmed visual indicator pattern to the storage device.

2. The spatial visual indicator device of claim 1, further comprising:
   a control circuit, configured to:
      detect a current condition of the incoming communication;
      compare the current condition with the plurality of possible conditions; and
      direct the spatial visual indicator to display a visual indicator pattern assigned to a condition of the plurality of possible conditions that matches the current condition.

3. The spatial visual indicator device of claim 1, wherein the spatial visual indicator comprises a plurality of illuminatable elements.

4. The spatial visual indicator device of claim 3, wherein the plurality of illuminatable elements are configured for at least one of color-varying and brightness-varying.

5. The spatial visual indicator device of claim 4, wherein the plurality of illuminatable elements comprises a plurality of red green blue (RGB) light emitting diodes (LEDs).

6. The spatial visual indicator device of claim 3, further comprising:
   a lens in front of at least a portion of the plurality of illuminatable elements, the lens comprising:
      a back side offset from and facing the portion of the plurality of illuminatable elements; and
      a front side opposite the portion of the plurality of illuminatable elements.

7. The spatial visual indicator device of claim 6, wherein the back side of the lens includes a plurality of valleys and a plurality of peaks defined by a plurality of facets.

8. The spatial visual indicator device of claim 7, wherein each of the plurality of facets forms approximately a ninety (90) degree angle with an adjacent facet of the plurality of facets.

9. The spatial visual indicator device of claim 6, wherein each of the front side, an inside surface, and an outside surface of the lens is substantially smooth.

10. The spatial visual indicator device of claim 6, wherein at least one of the front side, an inside surface, and an outside surface of the lens includes one or more facets.

11. The spatial visual indicator device of claim 6, wherein the lens comprises any one or more materials from the group consisting of a transparent plastic, a translucent plastic, a glass, a clear acrylic, a trivex, and a polycarbonate.

12. The spatial visual indicator device of claim 6, wherein the lens comprises a material with a refractive index of approximately 1.49.

13. The spatial visual indicator device of claim 6, wherein:
the plurality of illuminatable elements are secured to a plate-like member in a ring pattern surrounding an aperture in the plate-like member; and
the spatial visual indicator device further includes:
a camera lens assembly exposed by the aperture; and
a sleeve including one or more connecting receptacles configured to connect to one or more connecting members of the lens such that an inner surface of the lens and an outer surface of the sleeve are not in physical contact with each other, the sleeve further configured to slip around the camera lens assembly to secure the lens to the camera lens assembly.

14. The spatial visual indicator device of claim 6, wherein:
the plurality of illuminatable elements are secured to a plate-like member including one or more connecting receptacles configured to connect to one or more connecting members of the lens such that the lens may be mounted to the plate-like member in front of the plurality of illuminatable elements.

15. The spatial visual indicator device of claim 1, wherein the spatial visual indicator device is implemented as a communication device for the hearing impaired.

16. The spatial visual indicator device of claim 1, wherein the user interface is configured to display a plurality of illuminatable element selection options and a plurality of options for editing one or more illuminatable element that correspond to one or more selected illuminatable element selection options.

17. The spatial visual indicator device of claim 1, wherein each of the plurality of visual indicator patterns comprises a sequential series of frames.

18. The spatial visual indicator device of claim 17, wherein the user interface is configured to enable a user to edit a visual indicator pattern on a frame-by frame basis.

19. A method of visually indicating an incoming signal, the method comprising:
storing a plurality of possible conditions of the incoming signal and a plurality of visual indicator patterns in a storage device;
detecting a current condition of the incoming signal that matches one or more of the plurality of possible conditions;
assigning one or more of the plurality of possible conditions a visual indicator pattern of the plurality of visual indicator patterns;
directing a spatial visual indicator to display a visual indicator pattern of the plurality of visual indicator patterns that is assigned to the at least one of the plurality of possible conditions that matches the current condition responsive to detecting the current condition; and
at least one of:
sharing a visual indicator pattern of the plurality of visual indicator patterns through a communication network;
receiving another visual indicator pattern through the communication network; and
creating a user-created visual indicator pattern with a user interface.

20. The method of claim 19, wherein detecting the current condition of the incoming signal matching one or more of the plurality of possible conditions comprises detecting a caller identification of an incoming telephone call signal in at least one of a public switched telephone network (PSTN) and an internet protocol (IP) network.

21. The method of claim 19, wherein enabling the user to create the additional visual indicator pattern with the user interface comprises providing a plurality of illuminatable element selection options corresponding to a plurality of illuminatable elements of a spatial visual indicator and a plurality of options for editing one or more selected illuminatable element selection options.

22. The method of claim 19, wherein receiving the other visual indicator pattern through the network comprises receiving the other visual indicator pattern from another user through the network.

23. The method of claim 19, wherein receiving the other visual indicator pattern through the network comprises downloading the other visual indicator pattern from a website.

24. The method of claim 19, wherein sharing the visual indicator pattern of the plurality of visual indicator patterns through the network comprises sending the visual indicator pattern of the plurality of visual indicator patterns to another user.

25. The method of claim 19, wherein sharing the visual indicator pattern of the plurality of visual indicator patterns through the network comprises uploading the visual indicator pattern of the plurality of visual indicator patterns to a website.

26. A visual indicator system, comprising:
a communication device configured to communicate with a communication network;
a storage device configured to store a plurality of visual indicator patterns, and a plurality of possible conditions, each condition of the plurality of possible conditions corresponding to one of a plurality of visual indicator patterns;
a spatial visual indicator configured to display the plurality of visual indicator patterns;
a control circuit configured to monitor the communication network and detect a current condition of an incoming communication, the control circuit further configured to direct the spatial visual indicator to display a visual indicator pattern of the plurality of visual indicator patterns corresponding to a condition of the plurality of possible conditions that matches the current condition; and
a user interface configured to sense a user input, and responsive to the user input, cause the control circuit to perform at least one operation selected from the group consisting of:
send at least one of the plurality of visual indicator patterns through the communication network;
receive through the communication network and store on the storage device an additional visual indicator pattern; and
create and store a user-created visual indicator pattern on the storage device.

27. The visual indicator system of claim 26, wherein the user interface is integrated with the communication device.

28. The visual indicator system of claim 26, wherein the user interface is integrated with a portable communication device remote from the communication device.

29. The visual indicator system of claim 28, wherein the portable communication device comprises one of an infrared remote control, a tablet computer, and a cellular telephone device.

30. The visual indicator system of claim 26, wherein the spatial visual indicator is integrated with the output device of the user interface.

31. The visual indicator system of claim 26, wherein the spatial visual indicator includes one or more of a lens, a diffuser, and an infinity mirror.

32. The visual indicator system of claim 26, wherein the plurality of visual indicator patterns includes at least one of an altering colors and brightness pattern, a dimming tail pattern, a rainbow pattern, a sparkling pattern, a police pattern, a fire pattern, and a caution pattern.

33. The visual indicator system of claim 26, wherein the user interface is further configured to send the at least one of the plurality of visual indicator patterns to another user.

34. The visual indicator system of claim 26, wherein the user interface is further configured to receive the additional visual indicator pattern from another user.

* * * * *